United States Patent [19]

Kolze

[11] Patent Number: 4,541,448
[45] Date of Patent: Sep. 17, 1985

[54] FREEZE PROTECTION VALVE WITH METAL TO PLASTIC FITTING DESIGN

[75] Inventor: Lawrence A. Kolze, Bensenville, Ill.

[73] Assignee: Eaton Corporation, Cleveland, Ohio

[21] Appl. No.: 365,882

[22] Filed: Apr. 6, 1982

Related U.S. Application Data

[63] Continuation-in-part of Ser. No. 340,605, Jan. 19, 1982, Pat. No. 4,460,006.

[51] Int. Cl.$^4$ .................. F16K 17/00; G05D 23/02
[52] U.S. Cl. ........................... 137/62; 60/527; 126/420; 137/216; 137/315; 137/318; 137/468; 236/93 R; 236/99 J; 237/80; 251/11
[58] Field of Search ............. 137/59, 62, 216, 218, 137/468, 315, 318; 60/527; 126/419, 420, 422; 236/93 R, 99 J; 237/80; 251/11

[56] References Cited

U.S. PATENT DOCUMENTS

| | | | |
|---|---|---|---|
| 1,268,648 | 6/1918 | Van Meter | 137/62 |
| 1,716,339 | 6/1929 | Browne | 251/11 |
| 2,165,171 | 7/1939 | Zinkil | 236/93 B |
| 2,419,630 | 4/1947 | Cruzan et al. | 137/468 |
| 2,677,937 | 5/1954 | Jones | 236/93 R |
| 3,333,527 | 8/1967 | Bender | 251/11 |
| 3,887,159 | 6/1975 | Obermaier et al. | 251/11 |
| 3,938,741 | 2/1976 | Allison | 236/93 B |
| 4,066,090 | 1/1978 | Nakajima et al. | 137/62 |
| 4,295,602 | 10/1981 | Priesmeyer | 236/93 B |
| 4,296,770 | 10/1981 | Rice | 137/62 |

Primary Examiner—George L. Walton
Attorney, Agent, or Firm—Fay, Sharpe, Fagan, Minnich & McKee

[57] ABSTRACT

The freeze protection valve includes a molded plastic valve housing (A) including a peripheral wall (10) which defines an elongated recess (12) therein. The valve housing includes a first seating region (18) surrounding the elongated recess open end, a drain outlet (C) in fluid communication with the elongated recess, and at least one side fluid passage defining configuration (30). The side fluid passage defining configuration defines a first recess (32) having a wall portion (34) which is adapted to be cut through to provide one or more fluid passages (170) into the elongated recess. A first fitting assembly (60) includes a metal nipple (62) having a flange (64) peripherally therearound, a hold down plate (68), and a plurality of screws (70) for pressing the hold down plate and nipple flange in a fluid sealing relationship with the first or second seating region. The hold down plate and the upper end of the valve housing define a peripheral wrench receiving surface from which wrenching torques are transmitted by the hold down plate to the nipple. A freeze drain outlet valve (D) selectively opens and closes the freeze drain outlet. A thermal sensing assembly (E) is connected with the freeze drain outlet valve and with the valve housing for selectively causing the freeze drain outlet valve to open and close the freeze drain outlet in response to the temperature of fluid within the valve housing.

26 Claims, 6 Drawing Figures

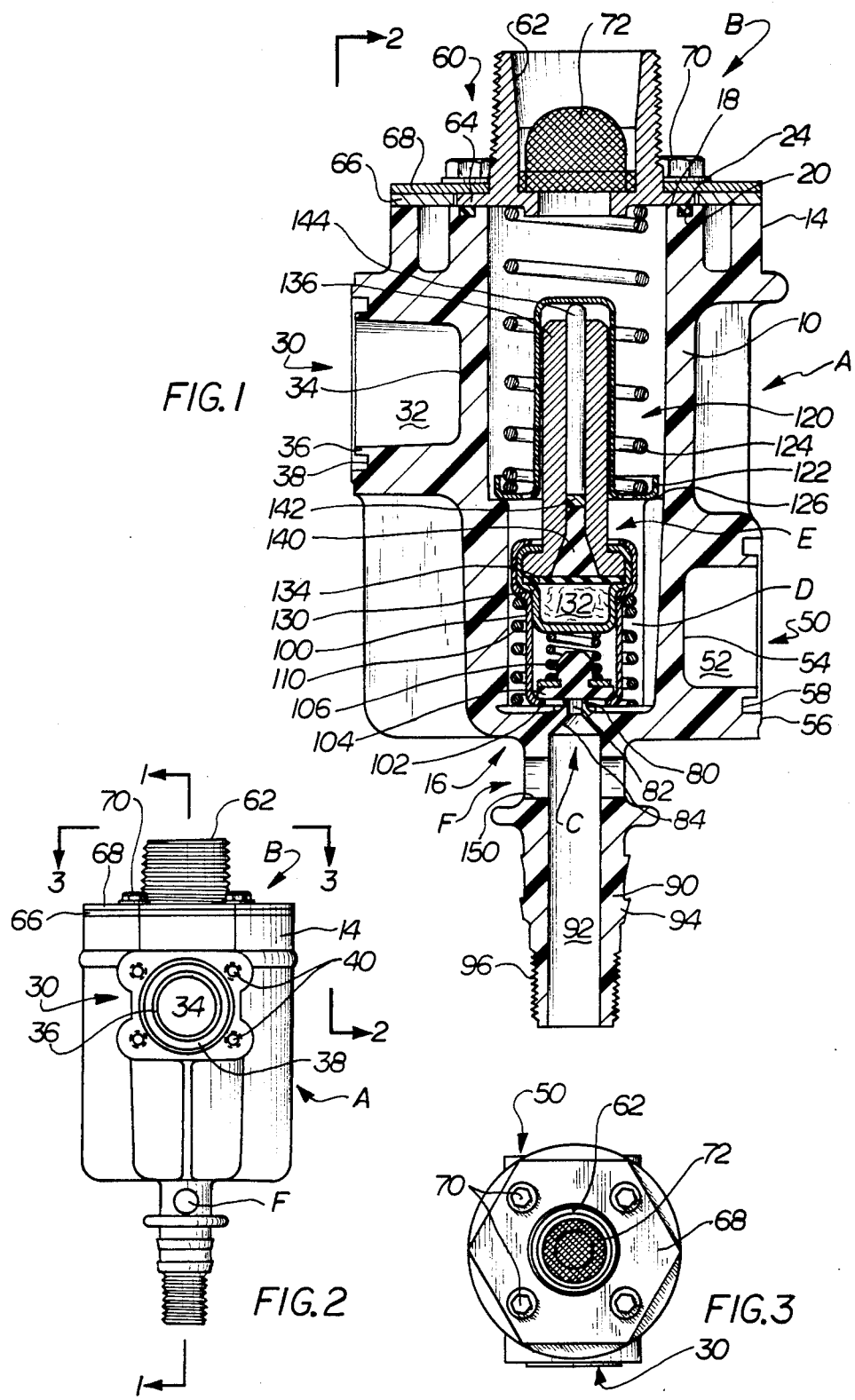

FREEZE PROTECTION VALVE WITH METAL TO PLASTIC FITTING DESIGN

BACKGROUND OF THE INVENTION

This application is a continuation-in-part of application Ser. No. 340,605 entitled Freeze Protection Valve and filed Jan. 19, 1982, now U.S. Pat. No. 4,460,006.

This application pertains to valves which selectively open and close in response to environmental conditions. More particularly, the invention relates to freeze protection valves which open automatically in response to a preselected low temperature condition. The invention finds particular application in freeze protection valves for solar water heating systems and will be described with particular reference thereto. It is to be appreciated, however, that the invention has broader applications including freeze protection for sections of residential and commercial plumbing systems and other fluid carrying or holding systems which may become exposed to freezing or near freezing conditions.

Conventionally, solar water heating systems have a roof mounted collector panel which includes an upper header or manifold, a lower header or manifold, and a plurality of tubes extending between the upper and lower headers. In a thermosiphon type solar heater, as the water is heated by the sun, it rises through the tubes from the lower header toward the upper header. A solar heated hot water storage tank is positioned above the upper header, commonly on the external surface of the roof. A cold water feed line connects the bottom of the hot water storage tank with the lower header to provide a path for the coolest water in the bottom of the tank to flow to the solar collector unit to be heated. A warm water return path connects the upper header with the storage tank to allow the solar heated water to rise from the upper header to the top of the tank. The storage tank has a warm water outlet from which heated water may be withdrawn and an inlet for replacing the withdrawn heated water with unheated water. In this manner, the water is heated and circulated by the thermosiphon effect.

To protect the solar water heating system from freezing, a freeze protection valve is connected below the lower header. When the temperature drops below a preselected low temperature, such as 45° F., the freeze protection valve opens draining water from the lower header and the solar heating system. The removal of the coldest water at the lowest portion of the system draws warmer water from the upper portions of the system raising the temperature of the solar collector piping and the freeze protection valve. The warmer water is usually at least 50° to 65° F., the temperature of unheated water received from a residential or commercial plumbing system. Thus, the freeze protection valve need only open intermittently to maintain the temperature in the solar heating system above the exemplary temperature of 45° F.

Commonly, the prior art freeze protection valves are constructed of plastic. When connecting the plastic valves with metal piping systems, plastic threads are frequently stripped or distorted.

Further, the prior art freeze protection valves sense the temperature of the fluid at their upper, inlet end which is connected below but adjacent the lower header. Because cold water is denser than warm water, a temperature gradient occurs between the freeze drain valve's upper inlet and lower freeze drain outlet. Under extreme cooling conditions, the temperature gradient across the freeze protection valve allows the lower portion of the valve to freeze before the upper portion senses that it should be opened. This freezing, of course, defeats the freeze protection purpose of the valve.

Conventionally, the freeze protection valve has a nipple or fitting around the drain outlet for connecting the freeze protection valve with a drain line. Under certain conditions, a pressure differential may occur across the drain outlet which causes fluid in the drain line to be returned into the freeze protection valve and mixed with the water in the solar heating system. This raises the potential for the water in the drain line to become contaminated and for the contaminated water to be mixed with the potable water in the solar heating system.

The present invention contemplates a new and improved freeze protection valve which facilitates interconnection with metal plumbing systems, inhibits freezing adjacent its drain outlet, and prevents discharged water in the drain line from becoming mixed with the water within the valve.

SUMMARY OF THE INVENTION

In accordance with the present invention, there is provided a freeze protection valve which comprises a valve housing, a fluid inlet assembly, a freeze drain outlet valving means, and a thermal sensing assembly. The valve housing has a peripheral wall which defines an elongated recess with an open end, a first seating region surrounding the elongated recess open end, and a drain outlet in fluid communication with the elongated recess. The inlet assembly is disposed adjacent and in fluid sealing engagement with the first seating region to provide for interconnection with an associated structure. The freeze drain outlet valving means selectively opens and closes the freeze drain outlet. The thermal sensing assembly is operatively connected with the freeze drain outlet valving means and with the valve housing for selectively causing the freeze drain valving outlet means to open and close the freeze drain outlet in response to the temperature of fluid within the valve housing.

In accordance with a second aspect of the invention, there is provided a freeze protection valve comprising a valve housing, a fitting assembly, a freeze drain outlet valving means, and a thermal sensing assembly. The valve housing has a peripheral wall which defines an elongated recess with an open end, a first seating region surrounding the elongated recess open end, a drain outlet in fluid communication with the elongated recess, a fluid transfer passage in fluid communication with the elongated recess, and a second seating region surrounding the fluid transfer passage. The fitting assembly is disposed in fluid sealing engagement with one of the first and second seating regions. The freeze drain outlet valving means selectively opens and closes the freeze drain outlet. The thermal sensing assembly is operatively connected with the freeze drain outlet valving means and with the valve housing for selectively causing the freeze drain outlet valving means to open and close the freeze drain outlet in response to the temperature of fluid within the valve housing.

A primary advantage of the present invention is that it facilitates interconnection of the freeze protection valve with metal fittings, plumbing, and pipes.

Another advantage of one aspect of the present invention is that it renders the freeze protection valve less susceptible to malfunctioning due to freezing.

Yet another advantage of another aspect of the present invention is that it inhibits contaminated drain water from being reintroduced into the fluid which is protected from freezing.

Still further advantages of the present invention will become apparent upon reading and understanding the following detailed description of the preferred and alternate embodiment.

BRIEF DESCRIPTION OF THE DRAWINGS

The invention may take form in various parts and arrangements of parts. The drawings are only for purposes of illustrating preferred embodiments of the invention and are not to be construed as limiting the invention.

FIG. 1 is a cross sectional view of a freeze protection valve in accordance with the present invention;

FIG. 2 is a side view of the valve of FIG. 1;

FIG. 3 is a top view of the valve of FIG. 1;

DESCRIPTION OF THE PREFERRED AND ALTERNATE EMBODIMENT

Figure 4:
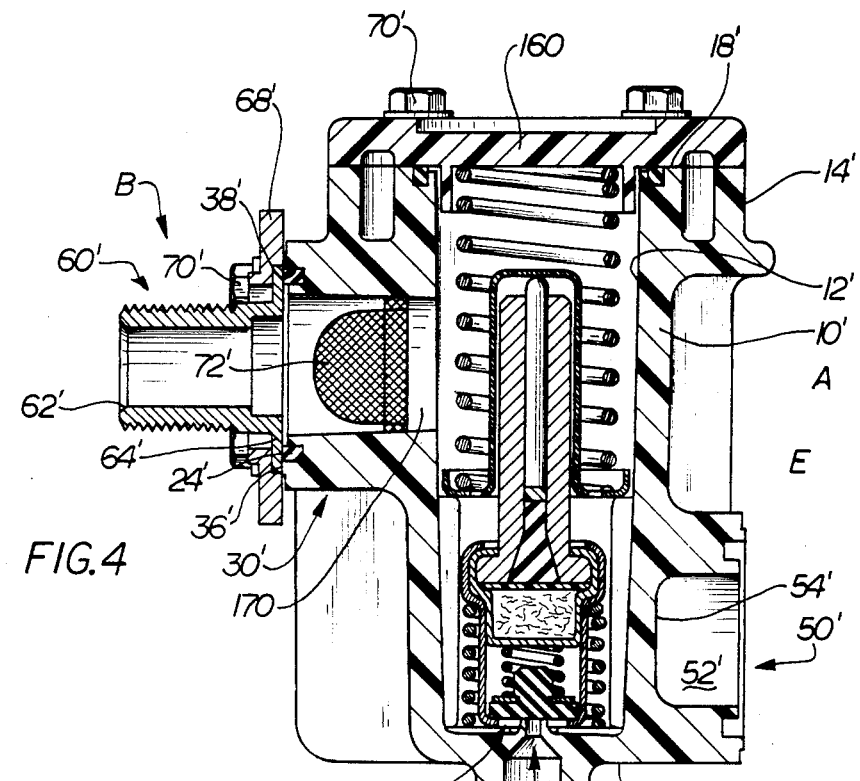
FIG. 4 is a cross sectional view of an alternate embodiment of a freeze protection valve in accordance with the present invention.

The freeze protection valve includes a molded plastic valve housing or body A and a metallic fitting means B to provide for fluid transfer between an associated structure and the freeze protection valve. The valve housing defines freeze drain outlet C through a lower wall portion. A freeze drain valve assembly or means D is disposed in the valve housing for selectively opening and closing the freeze drain outlet. A thermal energy sensing assembly or means E is operatively connected between the valve housing A and the freeze drain valve means D for causing the freeze drain outlet to be closed at higher temperatures and causing the freeze drain outlet to be opened below a preselected lower temperature. In this manner, the freeze protection valve blocks water or other fluid from draining from an associated structure when the fluid is above the preselected temperature and allows the fluid within the associated structure to drain when the temperature is below the preselected temperature. An air break means F is disposed adjacent the freeze drain outlet C for providing an air barrier between the fluid in a drain line and the fluid in the housing. The air break prevents a pressure differential between the valve housing and the drain line, thus preventing siphoning of drain water into the system.

Looking in detail to the embodiment of FIGS. 1, 2, and 3, the valve housing A includes a peripheral wall 10 which defines an elongated recess or cylindrical bore 12. The peripheral wall has a hexagonal upper or inlet end 14 and a bottom or outlet end 16. Surrounding the open end of the elongated recess, the upper valve housing end defines a first seating region 18 including an annular gasket receiving groove 20 and a plurality of threaded fastener receiving holes (not shown) for facilitating interconnection of the fluid transfer fitting means B. An elastomeric O-ring or other suitable gasket 24 is disposed in the gasket groove.

With particular reference to FIGS. 1 and 2, the housing A further includes a first or upper side fluid passage defining configuration 30. The upper side fluid passage defining configuration defines a first side recess 32 having a wall portion 34 which is adapted to be cut through to provide one or more fluid passages to the valve housing elongated recess 12. Disposed circumferentially around the first side recess is a second seating region 36 including an annular groove 38 which is adapted to receive a sealing gasket and a plurality of bores 40 which are adapted to receive screw fasteners. As is explained in greater detail in conjunction with FIGS. 4, 5, and 6 below, the upper side fluid passage defining configuration is adapted for interconnection with a fitting assembly of the fluid fitting means B.

With further reference to FIG. 1, the valve housing further includes a second or lower side fluid passage defining configuration 50. The lower side fluid passage defining configuration defines a second side recess 52 having a second side wall portion 54 which is adapted to be cut through to provide one or more fluid passages to the elongated recess. A third seating region 56 including an annular recess 58 adapted to receive a sealing gasket and a plurality of bores (not shown) adapted to receive screw fasteners is disposed circumferentially around the lower side recess 52.

The fitting means B includes a first or inlet fitting assembly 60 disposed adjacent and in fluid sealing relationship with the first seating region 18. The first fitting assembly includes a metallic threaded nipple 62 having a hexagonal or other non-circular flange 64 peripherally therearound. The nipple flange 64 is non-rotatably anchored in sealing engagement with the first seating region 18 and gasket 24 by a hold down means. The hold down means includes a metal inlet fitting plate 66 which has a hexagonal inner opening which receives the nipple flange, a peripheral surface, and a plurality of apertures therethrough which are adapted to be disposed in alignment with the fastener receiving holes. A metal hold down plate 68 extends over the upper surface of the nipple flange and the fitting plate to hold them in place. The hold down plate has a plurality of apertures therethrough in alignment with the fitting plate apertures and the fastener receiving holes for receiving a plurality of screws 70 therethrough tor press the hold down plate into tight frictional engagement with the nipple flange and to press the nipple flange in sealing engagement with the gasket 24. Optionally, the fitting plate 66 may be an integral part of the hold down plate 68. The fitting plate, the hold down plate, and the upper end of the housing have perpheries which define a peripheral wrench receiving surface which facilitates engagement with a wrench. In the preferred embodiment, the wrench surface is hexagonal but other rectalinear or partially rectalinear cross sections, such as square, which are adapted to be received in the jaws of a wrench are also contemplated. The metal fitting plate and the hold down plate transmit the torque from the wrench to the nipple 62 while the plastic housing upper wrench surface 14 guides the wrench and maintains it in alignment. A screen 72 is disposed across the interior of the inlet fitting to block particles from being carried into the valving means and the thermal sensing assembly to impair their operation.

At the valve housing lower end 16, the valve housing includes an annular inward projecting valve seat 80 which defines a drain aperture or bore 82 of the drain valve outlet C. The drain bore 82 has a relatively low length to cross sectional area ratio and a flared bore portion 84 such that any ice which might form therein is readily discharged. A discharge stem 90 extends downward from the housing lower end 16 and surrounds the freeze drain bore 82. The discharge stem defines a longitudinal fluid passage 92 for providing a fluid flow path for fluids discharged from the freeze drain outlet. A plurality of annular barbs 94 encircle the discharge stem for anchoring a frictionally received drain line or hose. A threaded portion 96 with a maximum diameter which is less than the minimum diameter of the annular barbs 94 is disposed adjacent the end of the discharge stem. The presence of the barbs and the threaded portion enable the freeze protection valve to be connected with a drain line with either a threaded engagement or with a frictional engagement.

The freeze drain outlet valve means D includes a valve cup 100 which is interconnected with the thermal sensing assembly E such that it is urged toward the freeze drain outlet under increasing temperatures. The valve cup has a bottom wall 102 with a central aperture which surrounds the valve seat 80. The valve seat projects inward beyond the valve cup bottom wall. A freeze drain valving element 104 is disposed within the valve cup to contact valve seat 80 when the valve cup 100 is in its lower most position. A valving element spring or biasing means 106 extends between the thermal sensing assembly and the valving element 104 to bias the valving element against the valve seat with a preselected pressure. A valve cup spring or biasing means 110 biases the valve cup and the valving element 104 away from the valve seat. The valve cup biasing means 110 has a greater spring force than the valving element biasing means 106 and a lesser spring force than the expansible force of the thermal sensing assembly E.

An over travel protection means 120 connects the thermal sensing assembly E with the fitting assembly 60 or the upper end of the valve housing A. The over travel protection means allows the thermal sensing assembly to extend after the valve cup bottom wall 102 has engaged the valve housing bottom wall 16. The over travel protection means 120 includes an over travel spring guide 122 which is connected with the thermal sensing assembly to be urged upward thereby as it extends. An over travel protection spring 124 is disposed between the inlet assembly B and the over travel spring guide to bias the over travel spring guide 122 and the thermal sensing assembly downward. A limit travel stop shoulder 126 limits the downward movement of the spring guide. The over travel protection spring 124 has a greater spring force than the valve cup biasing means 110.

The thermal sensing assembly E includes a thermal element cup 130 which is disposed at the end of the thermal sensing assembly closest to the freeze drain valving element 104. A thermally expansible element 132 which expands and contracts with changes in its temperature is contained within the thermal element cup. In the preferred embodiment, the thermally expansible element 132 is a thermally expansible wax pellet of composition well known to those skilled in the art which expands with increasing temperature and contracts with decreasing temperature. A flexible diaphragm 134 extends across the open end of the thermal element cup and the corresponding surface of the thermal element. A piston guide 136 is disposed adjacent the diaphragm 134 and constrains the diaphragm between the piston guide and the thermal element cup. The piston guide and the thermal element cup are maintained in a position firmly engaging the diaphragm by crimping the end of the thermal element cup. A piston assembly extends from the diaphragm 134 through an open bore defined by the piston guide 136. In the preferred embodiment, the piston assembly includes a force transmitting and amplifying means 140 which is connected by a polymeric spacer 142 with a rigid piston 144. The force transmitting means is a relatively incompressible rubber material which functions as a fluid. The piston guide bore expands adjacent the expansion element such that the rubber material functions as a fluid amplifier. The spacer inhibits the rubber material from flowing between the piston and the piston guide. As the thermal element 132 is warmed and expands, the piston 144 and the thermal element cup 130 are urged apart. As the thermal element 132 cools and contracts, the valve cup biasing means 110 and the over travel protection spring 124 urge the piston 144 and the thermal element cup 130 toward each other. By positioning the thermal element cup 130 and the thermal element 132, in the valve cup 100 and closely adjacent the valve seat 80, the thermal element is responsive to the temperature of the fluid adjacent the freeze drain outlet C. Because colder water is denser and settles toward the lowest point of the system and the freeze protection valve is normally disposed with the freeze drain outlet C at the lowest point of the system, the thermal element senses the temperature of the coldest water or other fluid in the protected fluid system. The freeze protection valve provides freeze protection even when there are large thermal gradients across the freeze protection valve. This is particularly important when the temperature gradient across the freeze protection valve exceeds the difference between the preselected drain temperature and freezing. Further, the ambient air temperature tends to cool the extremes of the system most rapidly, particularly the lowest end of the freeze protection valve.

The air break means F includes a cross hole or bore 150 defined by the lower valve housing portion and which is transverse to the discharge stem bore 92 and is immediately adjacent the flared bore portion 84. When the freeze protection valve is positioned in its normal, vertical position with the discharge stem bore extending vertically, the cross bore extends horizontally. In this manner, fluid discharged from the freeze drain flows by gravity past the cross bore through the discharge stem bore to a suitable disposal location. The cross bore provides antisiphon protection to prevent discharged fluids which may possibly become contaminated from being drawn back into the freeze protection valve. Further, the cross bore inhibits fluids from remaining in the discharge stem bore and the drain line and provides an overflow outlet if fluids should be forced up the discharge stem bore or the drain line or if the drain line should become clogged or frozen.

In operation, the coolest water or fluid in the associated system flows into the lower part of the freeze protection valve. The warmth of the water causes the thermal element 132 to expand or contract by a corresponding amount. When the water is warmer than the preselected drain temperature, the extension of piston 144 and thermal element cup 130 increases forcing the valve cup 100 against the lower end portion 12 and the valving element 104 closes the freeze drain outlet C. When the water is hot enough to increase the piston and thermal element cup extension further, the over travel spring 124 is compressed to protect the thermal sensing assembly E from its internal forces. When the water cools below the predetermined drain temperature, the piston and thermal element cup extension contracts allowing the over travel spring 124 to bias the spring guide 122 against the shoulder or stop 126. Still further contraction permits the valve cup biasing spring 110 to lift the valve cup 100 and with it the valving element 104. As the colder fluid drains from the bottom of the freeze protection outlet through the air break and into the drain, warmer water may replace it. The warmer water causes the thermal element 132 to expand closing the valve. In this manner, the freeze protection valve opens and closes intermittently.

Figure 5:
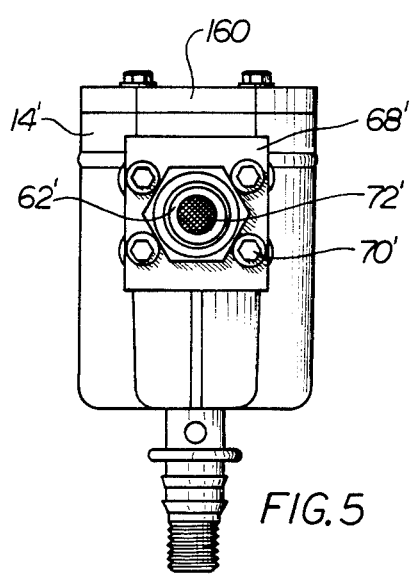
FIG. 5 is a side view of the valve of FIG. 4.
Figure 6:
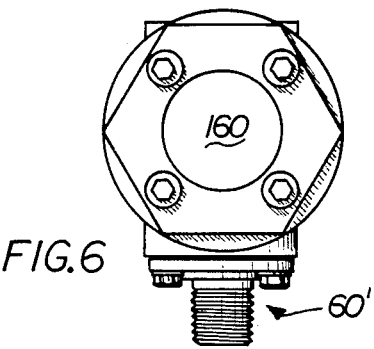
FIG. 6 is a top view of the valve of FIG. 4.

With reference to FIGS. 4, 5, and 6, a freeze protection valve for providing freeze protection to a system having horizontal or side freeze protection valve mounting is illustrated. Elements of the freeze protection valve of FIGS. 4, 5, and 6 which are common to the elements of the freeze protection valve of FIGS. 1, 2, and 3 are denoted with the same reference numeral followed by a prime ('). The valve housing A has a peripheral wall 10' which defines an elongated recess or cylindrical bore 12'. The peripheral wall has an upper end 14' and a bottom end 16'. Surrounding the open end of the elongated recess, the valve housing upper end defines a first seating region 18' including a gasket receiving groove 20' and a plurality of holes (not shown) for receiving screw fasteners.

A metallic closure means or plate 160 is pressed into a fluid sealing relationship with the seating region 18' by a plurality of screws 70'.

The valve housing A includes a first or upper fluid passage defining configuration 30'. The upper side fluid passage defining configuration defines a first fluid receiving passage 170 in fluid communication with the elongated recess. In the preferred embodiment, the valve housing is molded with a wall portion 34 blocking fluid access to the elongated recess. In the embodiment of FIG. 4, this wall portion is bored out, has a plurality of apertures drilled therethrough, or is otherwise cut through to provide fluid passage to the elongated recess. A second region 36' including an annular groove 38' and a plurality of bores (not shown) are disposed circumferentially around the upper side fluid passage 170. An O-ring or other suitable gasket 24' is disposed in the annular groove 38'.

The fitting means B includes a fitting assembly 60' disposed adjacent and in fluid sealing relationship with the second seating region 36'. The fitting assembly includes a metal threaded nipple 62' having a hexagonal flange 64' peripherally therearound. The nipple flange 64' is non-rotatably anchored in sealing engagement with the second seating region and gasket by a hold down means. The hold down means includes a hold down plate 68' having a hexagonal inner recess for receiving the nipple flange, a square periphery, and a plurality of apertures therethrough in alignment with the fastener receiving holes. A plurality of screws 70' press the hold down plate into tight frictional engagement with the nipple flange and press the nipple flange into sealing engagement with the second seating region 36'. The hold down plate transfers torque between the nipple and a wrench applied to its periphery. A screen 72' is disposed in the upper side fluid passage 170 to block particles from being carried into the elongated recess. In the preferred embodiment, the threaded nipple is metallic to facilitate interconnection with metal plumbing systems.

The valve housing A further includes a lower side fluid passage defining configuration 50' having a lower side recess 52' which is separated from the elongated recess by a wall portion 54'. Optionally, the wall portion 54' may be cut through and a second fitting assembly connected with the lower side fluid passage defining configuration 50'. By providing two fitted assemblies, the freeze protection valve is able to provide freeze protection to a fluid flow line in which fluid flows in one of the fitted assemblies and out the other. As yet another alternative, another fitting assembly can be connected adjacent the first seating region 18'. When two or three fitting assemblies are connected with the valve housing, each fitted assembly may be connected with a different low point in the protected system such that a single freeze protection valve protects a plurality of low points of the associated structure.

The freeze protection valve embodiment of FIGS. 4, 5, and 6 further includes a freeze drain valving means D, a thermal sensing assembly E, and an air break means F of substantially the same construction as the embodiment of FIGS. 1, 2, and 3. Reference is made to the embodiment of FIG. 1 for a description of the details of these structures.

When the freeze protection valve is protecting a fluid flow line, the temperature of the fluid in the line, particularly when no fluid is flowing, tends to approach the temperature of the ambient air. The coolest fluid tends to flow to the lowest point of the system and collects around the thermal sensing assembly E. When the fluid reaches the preselected low temperature, the thermal sensing assembly E actuates the freeze drain valving means D causing a fluid flow through the system and out the drain outlet C. The fluid flow continues until warmer fluid is drawn into the valve causing the thermal sensing assembly to close the freeze drain valving means.

The invention has been described with reference to the preferred embodiment. Obviously, modifications and alterations will occur to others upon reading and understanding the preceding detailed description of the preferred embodiment. It is intended that the invention be construed as including all such alterations and modifications which come within the scope of the following claims or the equivalent thereof.

Having thus described the preferred embodiment of the invention, I now claim my intention to be:

1. A freeze protection valve comprising:
   a one-piece plastic valve housing including an elongated recess defined by a peripheral wall with an open end, a drain outlet in fluid communication with the elongated recess, and a fluid transfer recess defined in the peripheral wall and having a wall portion which is adapted to be cut through to the elongated recess to provide a fluid transfer passage; the peripheral wall defining a first seating region surrounding the open end and defining a second seating region surrounding the fluid transfer recess which second seating region is adapted to receive a second detachable fitting assembly in a fluid sealing relationship therewith;
   a first detachable fitting assembly disposed adjacent the housing first seating region in fluid sealing engagement therewith;
   a freeze drain outlet valving means for selectively opening and closing the freeze drain outlet, the valving means including biasing means for biasing the valving means towards its open, draining position; and, a thermal sensing assembly which extends with increasing temperature and contracts with lowering temperature, the thermal sensing assembly being insertable through the open end and being disposed in the elongated recess and retained therein adjacent the drain outlet by the first fitting assembly, the thermal sensing assembly including a thermal element cup operatively connected with the freeze drain outlet valving means, a thermal sensing element disposed in the thermal element cup which expands with increasing temperature and contracts with decreasing temperature, a piston means operatively connected at one end with the thermal element and operatively connected adjacent its other end with the valve housing such that: (a) as the thermal element expands, the thermal sensing member urges the valving means against the biasing of biasing means toward the closed position and (b) as the thermal element contracts, the biasing means biases the valving means towards the open position, whereby the freeze protection valve opens and closes in response to temperature.

2. A freeze protection valve comprising:

a one-piece plastic valve housing having a peripheral wall defining: an elongated recess with an open end and a drain outlet disposed opposite the open end in fluid communication with the elongated recess, the valve housing defining a first seating region surrounding the elongated recess open end, a fluid transfer passage in fluid communication with the elongated recess, and a second seating region surrounding the fluid transfer passage;

a first detachable fitting assembly disposed adjacent the housing first seating region in fluid sealing engagement therewith;

a second detachable fitting assembly disposed adjacent the second seating region in fluid engagement therewith;

a freeze drain outlet valving means for selectively opening and closing the freeze drain outlet, the valving means including biasing means for biasing the valving means towards its open, draining position; and, a thermal sensing assembly which extends with increasing temperature and contracts with lowering temperature, the thermal sensing assembly being inserted through the open end and being disposed in the elongated recess retained therein adjacent the drain outlet by the first fitting assembly, the thermal sensing assembly being disposed in the elongated recess, the thermal sensing assembly including a thermal element cup operatively connected with the freeze drain outlet valving means, a thermal sensing element disposed in the thermal element cup which expands with increasing temperature and contracts with decreasing temperature, a piston means operatively connected at one end with the thermal element and operatively connected adjacent its other end with the valve housing such that: (a) as the thermal element expands, the thermal sensing assembly urges the valving means against the biasing of biasing means toward the closed position and (b) as the thermal element contracts, the biasing means biases the valving means towards the open position and biases the thermal sensing cup away from the drain outlet.

3. The valve as set forth in claim 2 wherein the second fitting assembly includes a second threaded nipple having a peripheral flange disposed adjacent the second sealing region, and a second hold down means for non-rotatably anchoring the second nipple flange in fluid sealing engagement with the second sealing region.

4. A freeze protection valve comprising:

a one-piece plastic valve housing having a peripheral wall defining an elongated recess with an open end and a drain outlet disposed opposite the open end in fluid communication with the elongated recess, the housing having a seating region surrounding the elongated recess open end;

a detachable fitting assembly disposed adjacent the housing seating region in fluid sealing engagement therewith;

a freeze drain outlet valving means for selectively opening and closing the freeze drain outlet, the valving means including biasing means for biasing the valving means towards its open, draining position; and, a thermal sensing assembly which extends with increasing temperature and contracts with lowering temperature, the thermal sensing assembly being insertable through the open end and being disposed in the elongated recess and retained therein adjacent the drain outlet by the first fitting assembly, the thermal sensing assembly including a thermal element cup disposed closely adjacent the drain outlet, a thermal sensing element disposed in the thermal element cup which expands with increasing temperature and contracts with decreasing temperature, a piston means operatively connected at one end with the thermal element and operatively connected adjacent its other end with the valve housing, the thermal element cup being operatively connected with the freeze drain outlet valving means to urge the valving means toward the closed position as the thermal element expands, and as the thermal element contracts the biasing means biases the valving means towards the open position.

5. The valve as set forth in claim 4 wherein the fitting assembly includes a threaded nipple and hold down means for non-rotatably anchoring the threaded nipple in a fluid sealing engagement with the seating region.

6. The valve as set forth in claim 5 wherein the nipple is metal.

7. The valve as set forth in claim 5 wherein the nipple includes a flange with a non-circular periphery disposed in fluid sealing engagement with the seating region and the hold down means includes a hold down plate having a nipple flange receiving recess which non-rotatably engages the nipple flange non-circular periphery.

8. The valve as set forth in claim 7 further including an annular gasket disposed between the nipple flange and the seating region to improve the fluid sealing engagement.

9. The valve as set forth in claim 7 wherein the hold down plate and the adjacent end of the valve housing define a wrench receiving surface, whereby the hold down plate transmits wrenching force from the wrench receiving surface to the nipple.

10. The valve as set forth in claim 7 further including a plurality of screws for anchoring the hold down plate to the valve housing.

11. The valve as set forth in claim 4 wherein the elongated recess is generally cylindrical and extends substantially perpendicular to the seating region.

12. The valve as set forth in claim 4 wherein the valving means includes a valve cup which is operatively connected with the thermal element cup to be urged downward thereby, the valve cup having a bottom valve wall which is adapted to abut the valve housing adjacent the freeze drain outlet, the valve cup bottom wall having an aperture therein which surrounds the freeze drain outlet, a valving element disposed between the valve cup bottom wall and the thermal element cup, and valve element biasing means for biasing the valve element against the valve cup bottom wall.

13. The valve as set forth in claim 12 further including a valve seat disposed on the valve housing surrounding the freeze drain outlet and extending into the valve housing a distance greater than the thickness of the valve cup bottom wall, whereby the valve element biasing means determines the pressure of which the valving element contacts the valve seat when the valve cup bottom wall is firmly against the valve housing.

14. The valve as set forth in claim 12 further including over travel protection means for allowing the thermal element to continue to expand after the valve cup bottom wall has contacted the valve housing.

15. The valve as set forth in claim 12 further including a discharge stem which defines an internal bore in fluid communication with the freeze drain outlet and a cross bore for providing an air break between the freeze drain outlet and the discharge stem bore.

16. A freeze protection valve comprising:
a one-piece plastic valve housing having a peripheral wall which defines an elongated recess with an open end, a first seating region defined on the peripheral wall surrounding the elongated recess open end, a drain outlet disposed opposite the open end in fluid communication with the elongated recess, a fluid transfer passage extending through the peripheral wall into fluid communication with the elongated recess, and a second seating region defined on the peripheral wall surrounding the fluid transfer passage;
a first detachable fitting assembly disposed in a fluid sealing engagement with the first seating region;
a second detachable fitting assembly disposed in a fluid sealing engagement with the second seating region;
a freeze drain outlet valving means for selectively opening and closing the freeze drain outlet;
a thermal sensing assembly operatively connected with the freeze drain outlet valving means and with the valve housing for selectively causing the freeze drain outlet valving means to open and close the freeze drain outlet in response to the temperature of the fluid within the valve housing and, the freeze drain outlet valving means and the thermal sensing assembly being insertable through the open end and being disposed in the elongated recess and retained therein adjacent the drain outlet by the first fitting assembly.

17. The valve as set forth in claim 16 wherein the thermal sensing assembly includes a thermal sensing element which expands with increasing temperature and contracts with decreasing temperature, a thermal element cup for supporting the thermal sensing element, a piston guide, and a piston means operatively connected with the thermal sensing element such that the distance between the piston means and the thermal element cup increases and decreases as the thermal sensing element expands and contracts.

18. The valve as set forth in claim 16 wherein the second fitting assembly includes a cover plate disposed adjacent the second seating region in fluid sealing engagement therewith.

19. The valve as set forth in claim 16 wherein the first fitting assembly includes a threaded nipple having a peripheral flange disposed adjacent the first seating region and a hold down means for non-rotatably holding the nipple flange in fluid seal engagement with the first seating region.

20. The valve as set forth in claim 19 wherein the valve housing is molded plastic and the nipple is metallic.

21. The valve as set forth in claim 20 wherein the hold down means defines a wrench receiving peripheral surface, the hold down means being adapted to transmit torque from the wrench surface to the nipple, whereby the hold down means protects the plastic housing from wrench induced torques.

22. The valve as set forth in claim 20 further including a gasket disposed between the nipple flange and the first seating region.

23. The valve as set forth in claim 20 wherein the thermal sensing assembly is disposed adjacent the drain outlet.

24. The valve as set forth in claim 20 further including an air break means disposed in a discharge stem adjacent the freeze drain outlet to provide an air break between the freeze drain outlet and a discharge stem passage.

25. The valve as set forth in claim 24 wherein the air break means includes an aperture defined by the discharge stem in fluid communication with the discharge stem passage.

26. The freeze protection valve as set forth in claim 16 wherein the first fitting assembly includes:
a threaded, metal nipple member having a threaded nipple portion and a flange portion with a preselected non-circular periphery, the nipple flange portion being disposed in fluid sealing engagement with the first seating region;
a metal fitting plate defining an inner opening which has said preselected non-circular periphery and non-rotatably receives the nipple flange portion therein, the fitting plate having a surface in contact with the first seating region;
a metal hold down plate defining an aperture through which the nipple portion is received and engaging the nipple flange portion and the fitting plate opposite to their seating region engaging surfaces;
fastening means extending through the hold down plate for pressing the hold down plate against the nipple flange portion and the fitting plate to press the nipple flange portion and the fitting plate against the seating region; and,
the fitting plate, the hold down plate, and the valve housing adjacent the first seating region having outer peripheral surfaces which define a common wrench receiving surface which is adapted to be received in a wrench, the fitting plate and the hold down plate being adapted to transmit torque from the wrench surface to the nipple member.

* * * * *